(12) United States Patent
Jang et al.

(10) Patent No.: US 6,177,290 B1
(45) Date of Patent: Jan. 23, 2001

(54) METHOD OF FABRICATING PLANAR OPTICAL WAVEGUIDES IN ONE CHAMBER

(75) Inventors: Woo-hyuk Jang; Sang-yun Yi, both of Yongin; Byong-gwon You, Daejeon; Jung-hee Kim, Seoul; Tae-hyung Rhee, Sungnam, all of (KR)

(73) Assignee: Samsung Electronics Co., Ltd., Suwon (KR)

( * ) Notice: Under 35 U.S.C. 154(b), the term of this patent shall be extended for 0 days.

(21) Appl. No.: 09/184,232

(22) Filed: Nov. 2, 1998

(30) Foreign Application Priority Data

Oct. 31, 1997 (KR) .................................................. 97-57256

(51) Int. Cl.⁷ ......................... H01L 21/31; H01L 21/3065
(52) U.S. Cl. ............................................. 438/31; 438/738
(58) Field of Search ................................ 438/31, 39, 706, 438/711, 712, 738, 740, 913; 385/131, 144, 123

(56) References Cited

U.S. PATENT DOCUMENTS

| | | | |
|---|---|---|---|
| 5,094,712 | * 3/1992 | Becker et al. | 252/79.1 |
| 5,719,410 | * 2/1998 | Suehiro et al. | 257/77 |
| 5,721,750 | * 2/1998 | Kwon et al. | 438/31 |
| 5,788,856 | * 8/1998 | Kühn | 438/31 |
| 5,885,881 | * 3/1999 | Ojha | 438/31 |
| 5,889,902 | * 3/1999 | Laube et al. | 438/31 |
| 5,891,748 | * 4/1999 | Sakata | 438/31 |
| 5,904,491 | * 5/1999 | Ojha et al. | 438/31 |
| 5,916,822 | * 6/1999 | Goldstein et al. | 438/91.3 |
| 5,962,347 | * 10/1999 | Tokunaga et al. | 438/728 |
| 5,985,685 | * 11/1999 | Lealman et al. | 438/31 |

FOREIGN PATENT DOCUMENTS

| | | |
|---|---|---|
| 0 599 394 A1 | 6/1994 | (EP) . |
| 1-272120 | 10/1989 | (JP) . |
| 4-256319 | 9/1992 | (JP) . |
| 9-33741 | 2/1997 | (JP) . |
| 9-82687 | 3/1997 | (JP) . |
| 9-115884 | 5/1997 | (JP) . |

OTHER PUBLICATIONS

M. Kawachi, "Silica–based optical waveguides and their application to integrated–optic devices", vol. 18, Dec. 1989, pp. 681–686, Japanese Journal of Optics (ISSN 0389–6625).
M. Kawachi, "Current status and future trends in planar lightwave circuit technologies", vol. 43, No. 11, 1994 pp. 1273–1280, NTT R&D (ISSN 0915–2326).
JP 8262250 A (Toshiba), WPI Abstract Acc No. 96–509304.

* cited by examiner

Primary Examiner—Savitri Mulpuri
(74) Attorney, Agent, or Firm—Robert E. Bushnell, Esq.

(57) ABSTRACT

A method of fabricating a planar optical waveguide in one chamber, comprising the steps of depositing a cladding layer and a core layer on a substrate, depositing an etch mask layer on the core layer, and forming a photoresist pattern on the etch mask layer. An etch mask pattern is formed by etching the etch mask layer according to the photoresist pattern using a first gas which reacts with the material of the etch mask layer, and removing the first gas. An optical waveguide is formed by etching the core layer according to the etch mask pattern using a second gas which reacts with the material of the core layer in the same chamber as the chamber where the above steps were performed, and removing the photoresist pattern and the second gas. The etch mask pattern is removed using the first gas which reacts with the material of the etch mask pattern in the same chamber as the chamber where the above steps were performed, and removing the first gas, and depositing an upper cladding layer formed of the same material as the core layer on the resultant structure of the above step. Accordingly, processes for fabricating an optical waveguide can be continuously performed in one chamber, thus simplifying and automating the optical waveguide fabrication method.

17 Claims, 3 Drawing Sheets

METHOD OF FABRICATING PLANAR OPTICAL WAVEGUIDES IN ONE CHAMBER

CLAIM OF PRIORITY

This application makes reference to, incorporates the same herein, and claims all benefits accruing under 35 U.S.C. §119 from an application for *METHOD OF FABRICATING PLANAR OPTICAL WAVEGUIDES IN ONE CHAMBER* earlier filed in the Korean Industrial Property Office on Oct. 31, 1997 and there duly assigned Ser. No. 57256/1997.

BACKGROUND OF THE INVENTION

1. Technical Field

The present invention relates to a method of fabricating planar optical waveguides in one chamber and, more particularly, to a method of fabricating planar optical waveguides in which consecutive processes are performed in one chamber while only changing reactive etch gases.

2. Related Art

In general, formation of optical waveguides of a planar waveguide device by etching is the core process for fabricating the planar waveguide device, and is accompanied by several processes.

First, after a cladding layer and a core layer are deposited on a planar substrate, an etch mask layer of predetermined material is deposited on the core layer and a photoresist PR is deposited on the etch mask layer to thus form a photoresist pattern using photolithography. Next, a mask pattern is manufactured by wet etching or dry etching the photoresist. After removing the mask layer remaining on the mask pattern, the core layer is etched according to an etch mask pattern, thereby forming an optical waveguide. An upper cladding layer is deposited on the optical waveguide.

However, this conventional etch mask pattern fabrication method requires PR ashing, etch mask pattern formation, waveguide pattern formation, and residual etched mask removal as special processes, which complicates process steps. Also, each step is performed in a different chamber to which a different reactive gas is supplied, which causes the substrate to be frequently exposed to the outside.

SUMMARY OF THE INVENTION

To solve the above problems, it is an object of the present invention to provide a method of fabricating a planar optical waveguide, by which the optical waveguide is fabricated through consecutive processes in a plasma etching chamber without exposing the substrate to the outside while changing the reactive etch gas necessary for each process.

Accordingly, to achieve the above objective, there is provided a method of fabricating a planar optical waveguide in one chamber, comprising the steps of: depositing a cladding layer and a core layer on a substrate, depositing an etch mask layer on the core layer, and forming a photoresist pattern on the etch mask layer; forming an etch mask pattern by etching the etch mask layer according to the photoresist pattern using a first gas which reacts with the material of the etch mask layer, and removing the first gas; forming an optical waveguide by etching the core layer according to the etch mask pattern using a second gas which reacts with the material of the core layer in the same chamber as the chamber where the above steps were performed, and removing the photoresist pattern and the second gas; removing the etch mask pattern using the first gas which reacts with the material of the etch mask pattern in the same chamber as the chamber where the above steps were performed, and removing the first gas; and depositing an upper cladding layer formed of the same material as the core layer on the resultant structure of the above step.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

In an optical waveguide fabrication method using single chamber plasma etching according to the present invention, exposure of a substrate can be minimized by supplying and exhausting to and from a chamber etch gases that selectively react to a photoresist PR, an etch mask, and an optical waveguide core material, respectively, in accordance with each process. For this, it is necessary to select etch gases having selective reactions to an etch mask material and the waveguide core material, respectively, thus requiring plasma etch equipment capable of supplying an etch gas which is selective relative to each material to be etched.

Figure 1A:
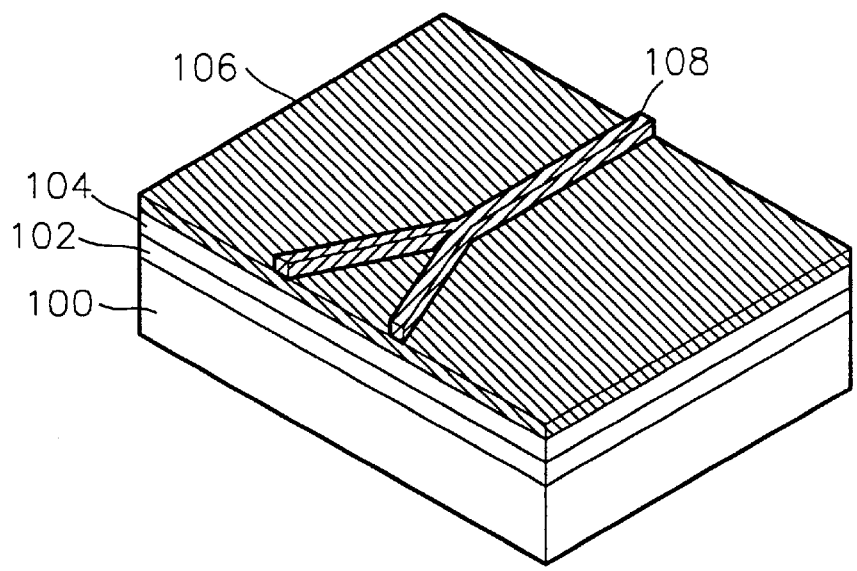
FIGS. 1A thru 1E are perspective views illustrating a process for fabricating a planar optical waveguide in a single chamber, according to the present invention.

First, in FIG. 1A, a cladding layer 102 and a core layer 104 are spin-coated on a silicon substrate 100 using polymer. A thin silica ($SiO_2$) film is deposited to a thickness between 0.1% and 10% of the thickness of the core layer, to thus form an etch mask layer 106.

In order to fabricate an optical waveguide of silica, the cladding layer 102 and the core layer 104 are deposited on the silicon substrate 100 using silica, and the etch mask layer 106 is then formed of a metal such as Ni or Cr in the above-described manner.

A PR film is spin-coated on the etch mask layer 106, and the PR film is patterned by a photolithography process, and ashed, thereby forming a photoresist pattern 108 for an etch mask pattern.

Figure 1B:
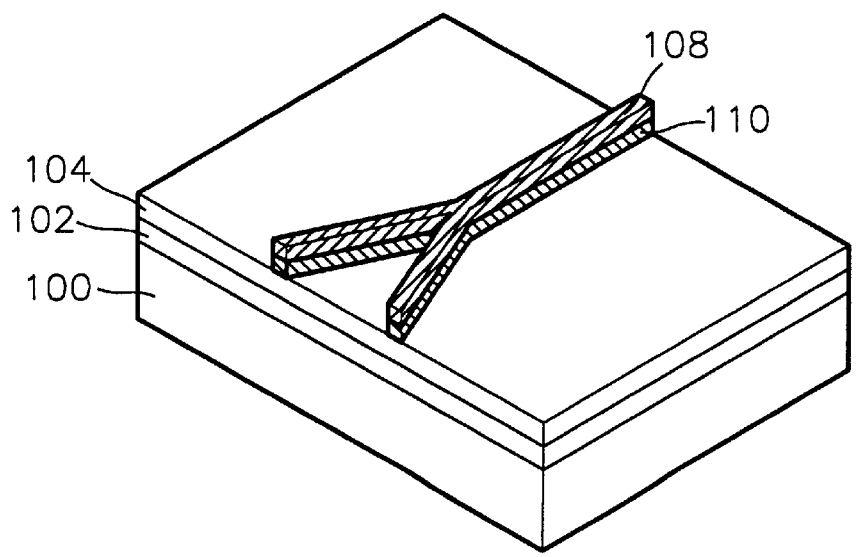

In FIG. 1B, when the etch mask layer is formed of silica, an etch mask pattern 110 is formed by plasma etching using a fluorine-containing reactive gas such as $CF_4$, $CHF_3$, $C_2F_6$ or $SF_6$. When the etch mask layer is formed of the above-described metal, an etch mask pattern 110 is formed by plasma etching using a chlorine-containing reactive gas such as $Cl_2$, or $BCl_3$.

Figure 1C:
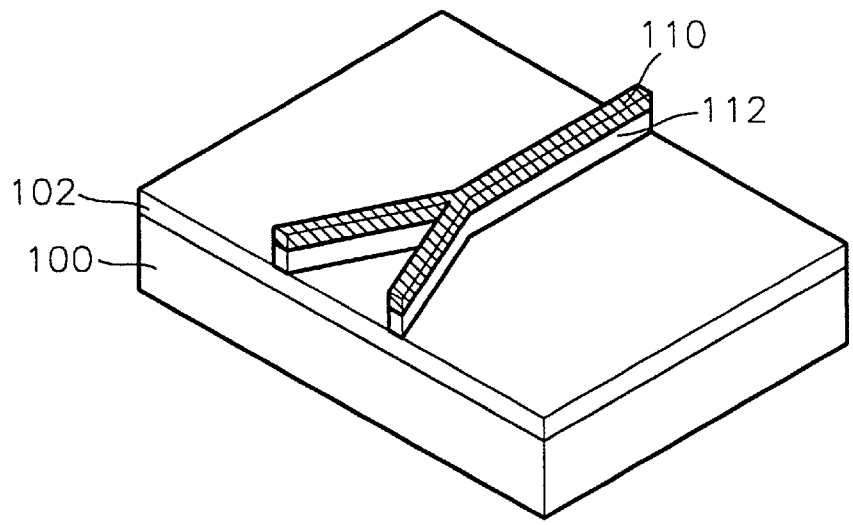

In FIG. 1C, when the core layer 104 is formed of polymer, a reactive gas is replaced by a $O_2$-containing gas such as $O_2$, a gas mixture of $O_2$ and Ar, or a gas mixture of $O_2$ and He in the same chamber as in the step of FIG. 1B, and the core layer is then etched, thereby forming an optical waveguide 112.

When the core layer 104 is formed of silica, a reactive gas is replaced by a fluorine-containing reactive gas such as $CF_4$, $CHR_3$, or $SF_6$, and the core layer is then etched, thereby forming an optical waveguide 112.

In this process, the PR pattern remaining on the etch mask pattern 110 is also removed.

Figure 1D:
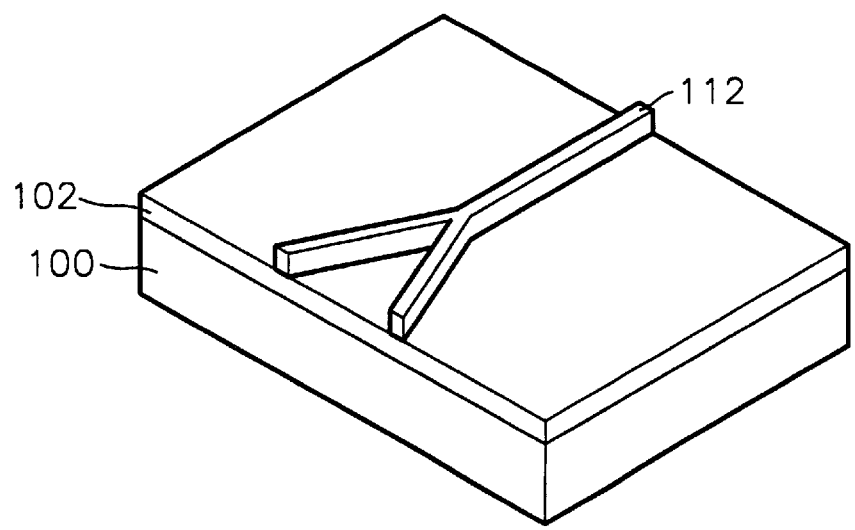

In FIG. 1D, when the etch mask pattern is formed of silica, a reactive gas is replaced by the above-described fluorine-containing gas in the same chamber as in the step of FIG. 1C, and a residual etch mask is then removed. Alternatively, when the etch mask pattern is formed of a metal, the reactive gas is replaced by the above-described chlorine-containing gas in the same chamber as in the step of FIG. 1C, and a residual etch mask is then removed.

While replacing the reactive gas in each step, a reactive gas used in a previous step is exhausted to keep the pressure between about $5 \times 10^{-5}$ torr and $10^{-6}$ torr.

Figure 1E:
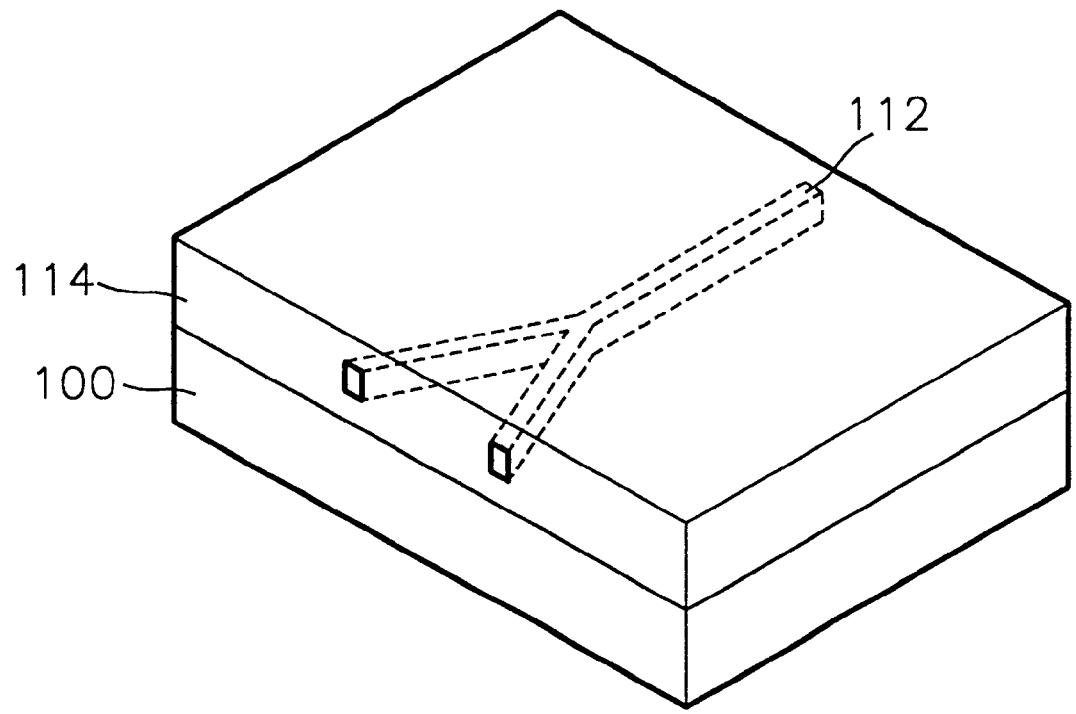

In FIG. 1E, an upper cladding layer 114 is deposited on the optical waveguide 112, thus completing formation of the basic structure of a planar waveguide.

The above embodiment merely exemplifies the present invention, and the present invention is not limited by this embodiment. Such a single chamber plasma etching process can be commonly applied to the cases of each of a silica core, a lithumnaobate ($LiNbO_3$) core, and a compound semiconductor core and each of a metal etch mask and a silicon polymer etch mask besides the case of the polymer core and the silica etch mask, by selecting an appropriate reactive etch gas according to each case.

According to the present invention, processes for fabricating an optical waveguide can be continuously performed in one chamber, thus simplifying and automating the optical waveguide fabrication method. Also, external exposure of a substrate for fabricating the optical waveguide is minimized, and the consecutive processes can be simplified as a single process. it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A method of fabricating a planar optical waveguide in one chamber, comprising the steps of:
    depositing a cladding layer and a core layer on a substrate, depositing an etch mask layer on the core layer, and forming a photoresist pattern on the etch mask layer;
    forming an etch mask pattern by etching the etch mask layer according to the photoresist pattern using a first gas which reacts with material of the etch mask layer, and removing the first gas;
    forming an optical waveguide in the same chamber as the chamber where the above steps were performed by etching the core layer according to the etch mask pattern using a second gas which reacts with material of the core layer, and removing the photoresist pattern and the second gas;
    removing the etch mask pattern in the same chamber as the chamber where the above steps were performed using the first gas which reacts with the material of the etch mask pattern, and removing the first gas; and
    depositing an upper cladding layer formed of material identical to material of the core layer on the structure resulting from the above steps;
    wherein the photoresist pattern is removed at the same time as the core layer is etched.

2. The method of fabricating a planar optical waveguide in one chamber as claimed in claim 1, wherein the core layer is formed of polymer and the etch mask is formed of silica.

3. The method of fabricating a planar optical waveguide in one chamber as claimed in claim 2, wherein the first gas is a fluorine-containing gas.

4. The method of fabricating a planar optical waveguide in one chamber as claimed in claim 2, wherein the second gas is one selected from the group consisting of oxygen and gases mixed with oxygen.

5. The method of fabricating a planar optical waveguide in one chamber as claimed in claim 1, wherein the core layer is formed of silica and the etch mask is formed of a material selected from the group consisting of nickel and chromium.

6. The method of fabricating a planar optical waveguide in one chamber as claimed in claim 5, wherein the first gas is a chlorine-containing gas.

7. The method of fabricating a planar optical waveguide in one chamber as claimed in claim 5, wherein the second gas is a fluorine-containing gas.

8. The method of fabricating a planar optical waveguide in one chamber as claimed in claim 1, wherein a thickness ratio between the core layer and the etch mask is in the range of 1000:1 to 10:1.

9. A method of fabricating a planar optical waveguide in one chamber, comprising the steps of:
    disposing a substrate in said one chamber;
    depositing a cladding layer and a core layer on the substrate, depositing an etch mask layer on the core layer, and forming a photoresist pattern on the etch mask layer in said one chamber;
    forming an etch mask pattern by etching the etch mask layer according to the photoresist pattern using a first gas in said one chamber and removing the first gas from said one chamber;
    forming an optical waveguide by etching the core layer according to the etch mask pattern using a second gas in said one chamber, removing the photoresist pattern, and removing the second gas from said one chamber; and
    removing the etch mask pattern using the first gas in said one chamber, and removing the first gas from said one chambers;
    wherein the photoresist pattern is removed at the same time that the core layer is etched.

10. The method of fabricating a planar optical waveguide in one chamber as claimed in claim 9, further comprising the step of depositing an upper cladding layer formed of a material identical to material of the core layer on the structure resulting from the above steps.

11. The method of fabricating a planar optical waveguide in one chamber as claimed in claim 9, wherein the core layer is formed of polymer and the etch mask is formed of silica.

12. The method of fabricating a planar optical waveguide in one chamber as claimed in claim 11, wherein the first gas is a fluorine-containing gas.

13. The method of fabricating a planar optical waveguide in one chamber as claimed in claim 11, wherein the second gas is one selected from the group consisting of oxygen and gases mixed with oxygen.

14. The method of fabricating a planar optical waveguide in one chamber as claimed in claim 9, wherein the core layer is formed of silica and the etch mask is formed of a material selected from the group consisting of nickel and chromium.

15. The method of fabricating a planar optical waveguide in one chamber as claimed in claim 14, wherein the first gas is a chlorine-containing gas.

16. The method of fabricating a planar optical waveguide in one chamber as claimed in claim 14, wherein the second gas is a fluorine-containing gas.

17. The method of fabricating a planar optical waveguide in one chamber as claimed in claim 9, wherein the thickness ratio between the core layer and the etch mask is in the range of 1000:1 to 10:1.

* * * * *